United States Patent [19]

Forsberg

[11] 4,220,242
[45] Sep. 2, 1980

[54] SCREW CONVEYOR WITH INTERMEDIATE BEARING

[76] Inventor: Georg L. K. Forsberg, Nylandsgatan 14, Karlstad, Sweden

[21] Appl. No.: 960,721

[22] Filed: Nov. 14, 1978

[30] Foreign Application Priority Data

Nov. 21, 1977 [SE] Sweden ............................... 7713075

[51] Int. Cl.² ...................... B65G 33/20; B65G 33/32
[52] U.S. Cl. .................................. 198/666; 198/658; 198/670; 198/672
[58] Field of Search ............... 198/658, 664, 666, 670, 198/672, 673

[56] References Cited

U.S. PATENT DOCUMENTS

| | | | |
|---|---|---|---|
| 843,676 | 2/1907 | Gustavsen | 198/673 X |
| 1,401,155 | 12/1921 | Jacoby | 198/672 X |
| 2,545,140 | 3/1951 | Escher | 198/672 X |
| 2,630,906 | 3/1953 | Philipp | 198/672 X |
| 2,933,175 | 4/1960 | Gray . | |
| 3,050,176 | 8/1962 | Brelsford . | |
| 3,278,001 | 10/1966 | Andrews | 198/672 |

FOREIGN PATENT DOCUMENTS 580159 11/1977 U.S.S.R. .................................. 198/666

*Primary Examiner*—Jeffrey V. Nase
*Attorney, Agent, or Firm*—Cushman, Darby & Cushman

[57] ABSTRACT

A screw conveyor for feeding solid granular material including a rotary shaft with a screw blade, a drum surrounding the screw blade and concentric with it, and a bearing supporting the shaft for rotation with respect to the drum at an intermediate axial position of the shaft. The screw blade is discontinued at the bearing, having two end portions spaced apart a distance greater than the axial length of the bearing along the shaft. Arms connect the bearing to the drum for applying an axial force to the material being fed past the discontinuity in the screw blade upon relative rotation between the screw blade and the drum. The drum and shaft are normally rotated in different directions. The arm makes a positive angle of about 15° to 50° with respect to a plane perpendicular to the shaft, and is disposed in a plane intersecting a continuation of each of the screw end portions, each arm having an axial dimension at least one half the axial distance between the screw conveyor end portions, and at least 75% of the axial dimension of the bearing.

8 Claims, 5 Drawing Figures

SCREW CONVEYOR WITH INTERMEDIATE BEARING

BACKGROUND AND SUMMARY OF THE INVENTION

The invention is concerned with the provision of a screw conveyor for feeding granular material upon relative rotation between the screw and a surrounding concentric drum—such as shown in U.S. Pat. No. 1,401,155—the screw alone being rotatable, or the screw being rotatable in the opposite direction that the drum is rotatable. In long screw conveyors, it is necessary to provide a bearing at an intermediate axial position of the shaft for the screw conveyor for supporting the shaft for proper rotation. As shown in U.S. Pat. Nos. 2,545,140 and 2,630,906, at the location of such bearing means, the screw blade must be interrupted, and the supporting means for the bearing means forms an obstruction to the movement of the material past the interruption of the screw blade. Thus, the flow of material is hampered, and there is also the possibility that compacting of the material into a plug can occur such that the operation of the screw conveyor is completely stopped, or that deposits will be formed that require repeated cleaning.

According to the present invention, the problems inherent in the prior art in the provision of an intermediate bearing means along the shaft for the screw conveyor have been overcome. The problem has been solved by providing means for connecting the bearing means to the drum for applying an axial force to the material being fed past the discontinuity in the screw blade upon relative rotation between the screw blade and the drum. The connecting means comprises at least one radially extending arm means affixed to the bearing means and the drum, the arm means preferably comprising a plurality of arms. Each arm makes a positive angle $\alpha$ of about 15° to 50° with respect to a plane perpendicular to the shaft, and is disposed in a plane intersecting a continuation of each of the screw end portions, whereby the axial feeding capabilities are facilitated. The arms may have any suitable shape and cross section, although substantially flat arms of substantially uniform thickness are usually preferred. In any event, the axial dimension of each arm is at least one half the axial distance between the screw conveyor end portions, and at least 75% of the axial dimension of the bearing means.

The arms may be connected to an intermediate short drum section and the drum section in the bearing means may each be divided along an axial plane and thus be removable at least in part to facilitate access to the bearing means and the arms.

It is the primary object of the present invention to provide a screw conveyor with intermediate bearing means that does not have the flow hampering and compacting problems inherent in the prior art. This and other objects of the invention will become clear from an inspection of the detailed description of the invention, and from the appended claims.

DETAILED DESCRIPTION OF THE DRAWINGS

Figure 3:
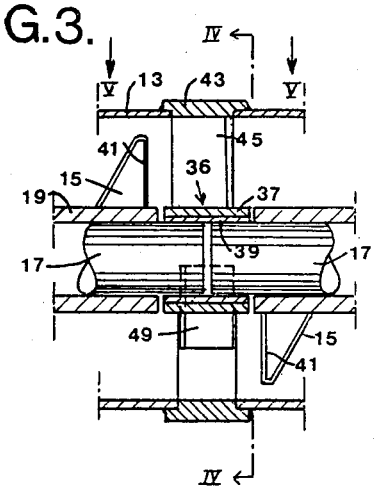
FIG. 3 is a detail axial sectional view of the screw conveyor of FIG. 1 at an intermediate bearing.

An examplary screw conveyor according to the present invention for the feeding of granular material includes a feed screw 11 with a surrounding, substantially concentric, cylindrical drum 13. The feed screw 11 is conventional and formed by a continuous helically wound thin plate screw blade 15, and is attached to a rotary shaft 17 either directly, or through an intermediate sleeve 19 (see FIG. 3). The ends of the shaft 17 are supported by bearings 21 and 23, and a drive motor 25 comprises means for rotating the shaft 17 with screw blade 15 in a first radial direction A (see FIG. 4) the motor 25 thus effects relative rotation between the screw conveyor 11 and the cylindrical drum 13. Preferably, the drum 13 is also mounted for rotation, being supported at its ends by bearings 27, 29, or the like. A motor 31 comprises means for rotating the drum 13 in a rotational direction B (see FIG. 4) opposite to the direction of rotation A of the screw conveyor 11. Normally, the speed of rotation of the drum 13 is slower than the speed of rotation of the screw conveyor 11, and is separately adjustable.

Various feed systems and outlets may be provided for the screw conveyor 11. As shown in the drawings, an inlet hopper 33 may be mounted at one end of the drum 13 into which the granular material to be conveyed is supplied. At the other end of the drum 13 an outlet spout 35 is provided through which the material conveyed by the screw conveyor 11 is discharged. Alternatively, the drum 13 may be provided with inlet or outlet apertures distributed over its periphery and length which apertures replace or supplement the inlet 33 and outlet 35, and in such a case the drum 13 may be movable in a transverse direction and perform either a movement parallel to itself or a swinging movement. The conveyor may thus be constructed as shown in copending application Ser. No. 845,838, filed Oct. 26, 1977, the disclosure of which is hereby incorporated by reference in the present application. The screw conveyor according to the present invention may be horizontal or disposed at an angle with respect to the horizontal.

At one or more intermediate axial positions of the shaft 17, bearing means 36 are provided for supporting the shaft 17 for rotation with respect to the drum 13. The bearing means 36 may be of any conventional type such as ball bearings, roller bearings, or—as shown in the drawings (see FIGS. 3 through 5 in particular)—a slide bearing consisting of a sliding sleeve 37 with a bushing 39 of antifriction material. The shaft 17 may extend through the bearing means 36, or it may be interrupted at the bearing means 36, with shaft buts being inserted in the bearing from opposite ends (see FIG. 3) and connected to each other by a spline arrangement or the like (not shown) for transferring the driving force. The screw blade 15 is discontinued at the bearing means 36, having two end portions 41 on opposite sides thereof, the end portions 41 being spaced apart a distance greater than the axial length of the bearing means 36 along the shaft 17.

According to the present invention, means for connecting the bearing means 36 to the drum 13 for applying an axial force to the material being fed past the discontinuity in the screw blade 15 upon relative rotation between the screw blade 15 and the drum 13 are provided. Such means eliminate the problems inherent in prior art structures in which the flow of material is hampered and there is the possibility of compaction of material into a plug or the formation of deposits which require constant cleaning at the area of the connection of the bearing means to the drum. The connecting means according to the present invention preferably comprises at least one radially extending arm means affixed to the bearing means 36 in the drum 13. Such arm means preferably comprises a plurality of arms 45, 47, and 49. The term "arm" as used in the specification and claims encompasses paddles, shovels, sickles, buckets, and the like; that is, the arms may be provided with a straight, slightly curved, or other cross section, the cross section may be uniform along the length, tapered, or wider at the middle, and the arms may be quadrate, lenticular, oval, or the like in plan.

Preferably, the radially extending arms 45, 47, 49, are connected to an intermediate short drum section 43, the arms 45, 47, 49, being rigidly attached to the drum section 43 and the bearing sleeve 37 or the like, as by welding. The radial centerlines of the arms 45, 47, 49, are disposed in a plane P (see FIG. 5) perpendicular to the shaft 17. Each arm (see arm 45 in FIG. 5) makes a positive angle α with respect to the plane P, and is disposed in a plane P' intersecting a continuation of each of the screw end portions 41. The angle α is preferably about 15° to 15°, and the arms 45, 47, 49, are normally substantially flat and of substantially uniform thickness.

For optimum feeding efficiency, the axial dimension of each of the arms 45, 47, 49 as positioned in the screw conveyor is at least ½ the axial distance between the screw conveyor end portions 41, and is at least 75% of the axial dimension of the bearing means 36.

Figure 1:
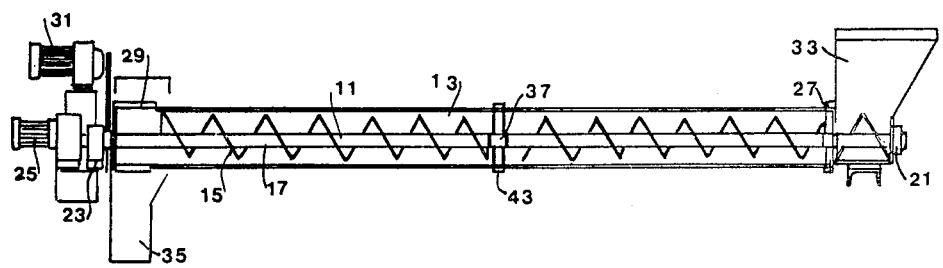
FIG. 1 is a side view partly in elevation and partly in cross section of an exemplary screw conveyor according to the invention.
Figure 2:
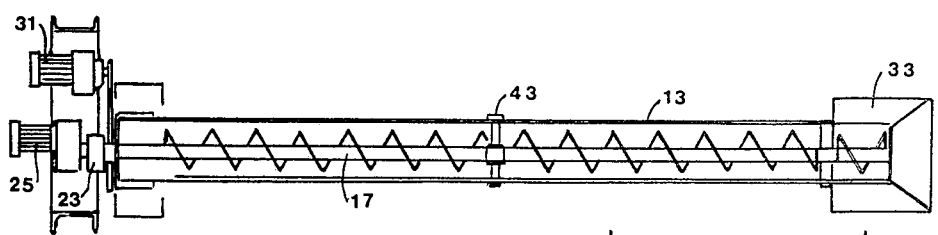
FIG. 2 is a top view partly in plan and partly in cross section of the screw conveyor of FIG. 1.
Figure 4:
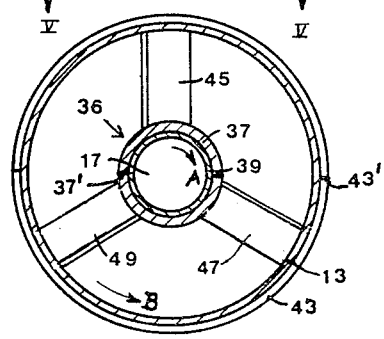
FIG. 4 is a cross-sectional view taken along lines IV—IV of FIG. 3.
Figure 5:
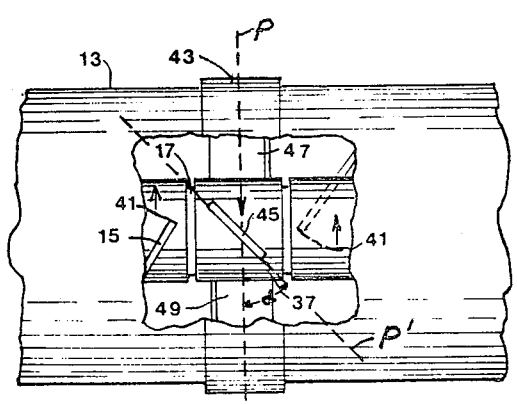
FIG. 5 is an elevational view, with portions cut away for clarity, taken in the direction of the arrows V of FIGS. 3 and 4.

In order to facilitate access to the bearing means 36 and the arms 45, 47, 49, the intermediate short drum section 43 may be split, as indicated at 43' (see FIG. 4), and the bearing means are divided along an axial plane, as indicated at 37' (see FIG. 4).

In order to further faciliate movement of the granular material past the bearing means 36, between the connecting arms 45, 47, 49, there may be disposed inclined wings, blades, or similar structures, which are merely attached to the drum section 43 and extend radially toward the shaft 17, but not being connected to the shaft.

Operation

In the operation of the screw conveyor illustrated in the drawings, granular material is fed into the hopper 33, and the blade 15 is rotated in direction A by the motor 25, while the drum 13 is rotated in direction B by the motor 31. In this way, the granular material is conveyed from the hopper 33 toward the outlet spout 35 in a continuous manner.

At an intermediate location, bearing means 36 are provided for supporting the shaft 17, mounting it for rotation with respect to the drum 13. The radially extending, particularly disposed arms 45, 47, 49, rigidly attach the bearing means 36 to the intermediate drum section 43, and because of their configuration and disposition, effect axial movement of the material toward the outlet 35 past the discontinuity in the screw blade 15. The material is thus carried across the discontinuity in a positive and efficient manner, eliminating the possibilities that dead zones of stagnant material will be built up around the connecting means, and elsewhere at the area of the discontinuity.

Should access to the bearing means 36 and/or arms 45, 47, 49, be desired, the intermediate drum section 43 is detached along the splits 43' therein, the bearing means 36 similarly being detached along the axial splits 37' therein.

While the invention has been herein shown and described in what is present conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A screw conveyor for feeding solid granular material, comprising:
   a rotary shaft with a screw blade attached thereto;
   a drum surrounding said screw blade and substantially concentric therewith said drum being rotatable about an axis concentric with said shaft axis;
   means for simultaneously rotating said shaft and said drum in opposite directions;
   bearing means for supporting said shaft for rotation with respect to said drum at an intermediate axial position of said shaft, said screw blade being discontinued at said bearing means and having two end portions spaced apart a distance greater than the axial length of said bearing means along said shaft; and
   means for connecting said bearing means to said drum to stationarily attach said bearing means to drum so that the bearing means rotate with said drum and relative to said rotary shaft, and for applying an axial force to the material being fed past the discontinuity in said screw blade upon relative rotation between said screw blade and said drum.

2. A screw conveyor as recited in claim 1 wherein said connecting means comprise at least one radially extending arm means affixed to said bearing means and said drum, said at least one arm means making a positive angle α with respect to a plane perpendicular to said shaft, and being disposed in a plane intersecting a continuation of each of said screw end portions.

3. A screw conveyor as recited in claim 2 wherein said at least one arm means comprises a plurality of arms, each arm making an angle α of about 15° to 50°.

4. A screw conveyor as recited in claims 2 or 3 wherein said arms each are substantially flat and of substantially uniform thickness.

5. A screw conveyor as recited in claims 2 or 3 wherein the axial dimension of said at least one arm means is at least one-half the axial distance between said screw conveyor end portions.

6. A screw conveyor as recited in claims 2 or 3 wherein the axial dimension of said at least one arm means is at least seventy-five percent of the axial dimension of said bearing means.

7. A screw conveyor as recited in claim 2 wherein said at least one arm means is connected to an intermediate short drum section.

8. A screw conveyor as recited in claim 7 wherein said intermediate short drum section and said bearing means are each divided along an axial plane, and removable at least in part, to facilitate access to said bearing means and said at least one arm means.

* * * * *